(12) United States Patent
Nakamura et al.

(10) Patent No.: US 8,699,187 B2
(45) Date of Patent: Apr. 15, 2014

(54) MANUFACTURING METHOD FOR A HEAD-STACK ASSEMBLY, APPARATUS FOR INTERCONNECTION OF THE HEAD-STACK ASSEMBLY, AND HEAD-STACK ASSEMBLY

(75) Inventors: Tetsuya Nakamura, Kanagawa (JP); Takahiro Sakai, Kanagawa (JP); Masahiko Katoh, Kanagawa (JP); Yasushi Inoue, Kanagawa (JP); Tetsuya Nakatsuka, Kanagawa (JP); Satoshi Kaneko, Kanagawa (JP); Masashi Okubo, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 572 days.

(21) Appl. No.: 12/642,683

(22) Filed: Dec. 18, 2009

(65) Prior Publication Data
US 2011/0109996 A1 May 12, 2011

(30) Foreign Application Priority Data

Dec. 19, 2008 (JP) .................................. 2008-323476

(51) Int. Cl.
*G11B 5/55* (2006.01)
(52) U.S. Cl.
USPC ................... 360/264.2; 360/234.5; 360/266.3
(58) Field of Classification Search
USPC .............................. 360/234.5, 264.2, 266.3; 29/603.03–603.04, 737
See application file for complete search history.

(56) References Cited

U.S. PATENT DOCUMENTS

| 5,657,531 | A | * | 8/1997 | Sato et al. ................... 29/603.04 |
| 6,085,410 | A | * | 7/2000 | Toensing et al. ................ 29/758 |
| 6,141,868 | A | * | 11/2000 | Schmidt et al. .................. 29/757 |
| 6,212,046 | B1 | * | 4/2001 | Albrecht et al. ............ 360/264.2 |
| 2003/0123194 | A1 | * | 7/2003 | Korkowski et al. ......... 360/245.9 |
| 2005/0152071 | A1 | * | 7/2005 | Hayakawa et al. ........ 360/266.3 |
| 2008/0034580 | A1 | | 2/2008 | Saito et al. |

FOREIGN PATENT DOCUMENTS

JP          11110925          4/1999

\* cited by examiner

*Primary Examiner* — Wayne Young
*Assistant Examiner* — Carlos E Garcia

(57) ABSTRACT

A manufacturing method for a head-stack assembly. The method includes preparing a head-stack assembly. The method further includes placing a connection pad forming surface of a connector tab formed on an end of the trace so as to be positioned opposite to an edge of a circuit board; sliding an elastic component along a backside of the connection pad forming surface; and, stopping the elastic component on the backside and pressing the backside with the elastic component so as to press the connection pad forming surface against the edge. In addition, the method includes metal-joining the connector tab and a connection pad of the circuit board by applying heat to a connection pad of the connector tab and the connection pad on the circuit board while pressing the connection pad forming surface against the edge with the elastic component; and, removing the elastic component after the metal-joining.

6 Claims, 13 Drawing Sheets (a)

(b)

(c)

US 8,699,187 B2

MANUFACTURING METHOD FOR A HEAD-STACK ASSEMBLY, APPARATUS FOR INTERCONNECTION OF THE HEAD-STACK ASSEMBLY, AND HEAD-STACK ASSEMBLY

CROSS-REFERENCE TO RELATED APPLICATION

This application claims priority from the Japanese Patent Application No. 2008-323476, filed Dec. 19, 2008, the disclosure of which is incorporated herein in its entirety by reference.

TECHNICAL FIELD

Embodiments of the present invention relate to a manufacturing method for a head-stack assembly, an apparatus for interconnection of the head-stack assembly, and a head-stack assembly.

BACKGROUND

Hard-disk drives (HDDs) have been widely used as data-storage devices of computers and have been one of indispensable data-storage devices in current computer systems. A HDD includes a magnetic-recording disk for storing data, a head-slider, and an actuator for moving the head-slider to a designated position in proximity with the recording surface of the magnetic-recording disk. The assembly of the actuator and the head-slider is called a "head-stack assembly," or "HSA". The actuator is driven by a voice coil motor (VCM) and pivots on a pivot shaft to move a head-slider in a nominally radial direction of the magnetic-recording disk in proximity with the recording surface of a spinning magnetic-recording disk. This enables the head-slider to access the magnetic-recording disk. The head-slider includes a slider on which magnetic-recording head is affixed, which includes a write element and/or a read element.

The actuator includes an elastic suspension, to which the head-slider is bonded. Force due to pressure caused by air viscosity between the air-bearing surface (ABS) of the head-slider facing the magnetic-recording disk and the spinning magnetic-recording disk balances a load on the head-slider applied by the suspension toward the magnetic-recording disk, so that the head-slider flies in proximity with the recording surface of the magnetic-recording disk. The suspension includes a gimbal for holding the head-slider on the surface of the suspension facing the magnetic-recording disk, and a load-beam for holding the gimbal on the surface of the load-beam facing the magnetic-recording disk. The gimbal is deformable so that the slider can tilt in specific directions to compensate for flutter of the magnetic-recording disk, for example.

On the actuator, a wiring structure, which is called a "trace," is formed for transmitting signals between a circuit chip, including an amplifier circuit, and elements on the head-slider. The circuit chip is mounted in a flexible printed circuit (FPC) affixed near the pivot shaft for the actuator. One end of the trace is connected with connection pads to the head-slider. The other end of the trace is connected with connection pads to the FPC.

Engineers and scientists engaged in HDD manufacturing and development are interested in manufacturing methods for components of the HDD, such as, the HSA, that are cost effective to meet the rising demands of the marketplace for increased value at low price, performance, and reliability.

SUMMARY

Embodiments of the present invention include a manufacturing method for a head-stack assembly. The method includes preparing a head-stack assembly. The head-stack assembly includes: an arm; a suspension secured to a distal end of the arm; a head-slider held by the suspension; a trace in which leads, which extend from the suspension for transmitting signals to a magnetic-recording head, are formed on a metal layer; and, a circuit board. The method further includes placing a connection pad forming surface of a connector tab formed on an end of the trace so as to be positioned opposite to an edge of the circuit board; sliding an elastic component along a backside of the connection pad forming surface; and, stopping the elastic component on the backside and pressing the backside with the elastic component so as to press the connection pad forming surface against the edge of the circuit board. In addition, the method includes metal-joining the connector tab and a connection pad of the circuit board by applying heat to a connection pad of the connector tab and the connection pad on the circuit board while pressing the connection pad forming surface against the edge of the circuit board with the elastic component; and, removing the elastic component after the metal-joining.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
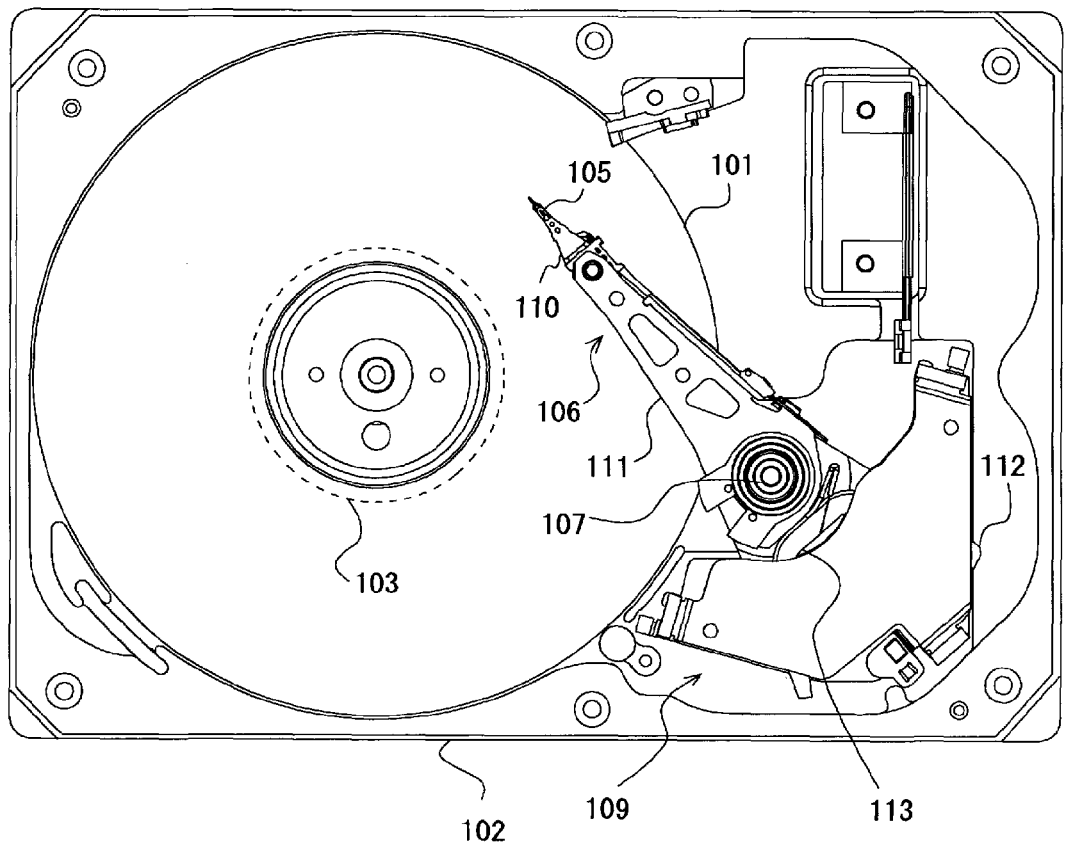
FIG. 1 is a plan view depicting a configuration of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Manufacturing Method for a Head-Stack Assembly, Apparatus for Interconnection of the Head-Stack Assembly, and Head-Stack Assembly With relevance to embodiments of the present invention, a method of solder-joining the trace and the FPC is known in the art. The terminal joining apparatus known in the art includes a pressing actuator for collectively pressing terminals of a plurality of suspensions against a plurality of terminals of an actuator block, a terminal joining chip for connecting the terminals of the plurality of suspensions and the terminals of the actuator block, a lateral direction positioning mechanism for lateral positioning of the terminals, and a longitudinal direction positioning pin for aligning the terminals of the plurality of suspensions in the longitudinal direction. The terminal joining apparatus provides accurate joining of the terminals of the plurality of suspensions and the terminals of the actuator block.

The above-described terminal joining apparatus presses the terminals of suspensions against the terminals of an actuator block with a pressing actuator to achieve secure interconnection between the terminals. In a head-stack assembly (HSA) known in the art, however, the terminals of suspensions and the terminals of an actuator block are stacked in the direction vertical to the pivot axis of the HSA, and the terminal joining apparatus presses the terminals of the suspensions against the terminals of the actuator block in the direction vertical to the pivot axis of the HSA. Accordingly, the apparatus cannot be used in manufacturing HSAs that do not have such a terminal structure.

Moreover, accurate positioning of the actuator to the terminals of suspensions is employed in the above-described terminal joining apparatus. The terminal area of the suspension and the terminal area of an actuator block include microscopic components, so a highly precise and complex apparatus configuration is employed for accurate positioning of the actuator with respect to the apparatus. In particular, the above-described terminal joining apparatus includes a number of positioning mechanisms; and, the configuration of the terminal joining apparatus is very complex.

Embodiments of the present invention include a manufacturing method of a head-stack assembly. In accordance with embodiments of the present invention, the method prepares a HSA. The HSA includes: an arm; a suspension secured to a distal end of the arm; a head-slider held by the suspension; a trace in which leads, which extend from the suspension for transmitting signals to a magnetic-recording head, are formed on a metal layer; and, a circuit board. In accordance with embodiments of the present invention, the method places a connection pad forming surface of a connector tab formed on an end of the trace so as to be positioned opposite to an edge of the circuit board. In accordance with embodiments of the present invention, the method slides an elastic component along a backside of the connection pad forming surface. In accordance with embodiments of the present invention, the method stops the elastic component on the backside and presses the backside with the elastic component so as to press the connection pad forming surface against the edge of the circuit board. In accordance with embodiments of the present invention, the method metal-joins the connector tab and a connection pad of the circuit board by applying heat to a connection pad of the connector tab and the connection pad on the circuit board while pressing the connection pad forming surface against the edge of the circuit board with the elastic component. In accordance with embodiments of the present invention, the method removes the elastic component after the metal-joining. Thus, in accordance with embodiments of the present invention, a simple apparatus and method provide secure interconnection between the connection pads of the connector tab and the circuit board to increase manufacturing yield of head-stack assemblies.

In one embodiment of the present invention, the method inserts two connector tabs between two projections of the circuit board, while each of the connection pad forming surfaces of the two connector tabs are positioned opposite to each of the edges of the two projections; the method inserts the elastic member between backsides of the connection pads forming surfaces of the two connector tabs while keeping the elastic member in contact with the backsides; the method stops the elastic component while keeping the elastic member in contact with the backsides of the two connector tabs, and presses the two backsides so as to press each of the connection pad forming surfaces of the two connector tabs against each of the edges; and, the method metal-joins the two connector tabs and connection pads of the circuit board by applying heat to connection pads of the two connector tabs and the connection pads on the circuit board while pressing each of the connection pad forming surfaces against each of the edges with the elastic component. Thus, in accordance with an embodiment of the present invention, the connection pads of the two connector tabs sandwiched between two projections of the circuit board and the connection pads of the circuit board can be securely joined by metal-joining using a simple apparatus and a simple method.

In another embodiment of the present invention, the elastic component is a U-shaped leaf spring. Thus, in accordance with an embodiment of the present invention, the elastic component can be placed easily and properly at the position on the backside of the connector tab and the heat capacity of the elastic component can be reduced. Furthermore, in another embodiment of the present invention, a tip of the leaf spring is formed with a curve. Thus, in accordance with an embodiment of the present invention, the deterioration in the spring properties of the leaf spring can be suppressed. Moreover, in another embodiment of the present invention, the curvature radius at the tip ranges from 0.05 millimeters (mm) to 0.3 mm. Thus, in accordance with an embodiment of the present invention, suppression of the deterioration in the spring properties and an appropriate pressing force can be provided. Alternatively, in another embodiment of the present invention, the leaf spring is made of a metallic material having a melting point of at least 300° C. Thus, in accordance with an embodiment of the present invention, deterioration by heating upon metal-joining can be suppressed. Moreover, in another embodiment of the present invention, a plate thickness of the leaf spring ranges from 0.03 mm to 0.1 mm. Thus, in accordance with an embodiment of the present invention, suppression of the deterioration in the spring properties and an appropriate pressing force can be provided.

In another embodiment of the present invention, the leaf spring includes two plate portions joining with the tip and provided in parallel; and an auxiliary spring mechanism is formed on at least one of the plate portions. Thus, in accordance with an embodiment of the present invention, the deterioration in the spring properties of the leaf spring can be suppressed. Moreover, in another embodiment of the present invention, the auxiliary spring mechanism includes a quadrangular plate that is located in a middle of the plate portion and is bent inward of the leaf spring to have spring properties. Thus, in accordance with an embodiment of the present invention, an auxiliary spring mechanism can be provided in a simple structure. Moreover, in another embodiment of the present invention, a width of the quadrangular plate having spring properties is wide at a proximal end and narrows toward the distal end. Thus, in accordance with an embodiment of the present invention, the deterioration in the spring properties of the auxiliary spring mechanism can be suppressed.

In accordance with embodiments of the present invention, a head-stack assembly includes: an arm; a suspension secured to a distal end of the arm; a head-slider held by the suspension; a trace in which leads, which extend from the suspension for transmitting signals to a magnetic-recording head, are formed on a metal layer; and, a circuit board. Moreover, in accordance with embodiments of the present invention, the head-stack assembly is manufactured by the following method. In accordance with embodiments of the present invention, the method places a connection pad forming surface of a connector tab formed on an end of the trace so as to be positioned opposite to an edge of the circuit board. In accordance with embodiments of the present invention, the method slides an elastic component along a backside of the connection pad forming surface. In accordance with embodiments of the present invention, the method stops the elastic component on the backside, and presses the backside with the elastic component so as to press the connection pad forming surface against the edge of the circuit board. In accordance with embodiments of the present invention, the method metal-joins the connector tab and a connection pad of the circuit board by applying heat to a connection pad of the connector tab and the connection pad on the circuit board while pressing the connection pad forming surface against the edge of the circuit board with the elastic component. In accordance with embodiments of the present invention, the method removes the elastic component after the metal-joining. Thus, in accordance with an embodiment of the present invention, a head-stack assembly can be obtained in which the connection pads of the connector tab and the circuit board are securely interconnected.

Yet another embodiment of the present invention includes an interconnection apparatus for a head-stack assembly. In accordance with embodiments of the present invention, the apparatus includes a support platform for supporting an head-stack assembly that includes: an arm; a suspension secured to a distal end of the arm; a head-slider held by the suspension; a trace in which leads, which extend from the suspension for transmitting a signal to a magnetic-recording head, are formed on a metal layer; and, a circuit board, in which a connection pad forming surface of a connector tab formed on an end of the trace is opposed to an edge of the circuit board. In accordance with embodiments of the present invention, the apparatus further includes a press tool including an elastic portion which is configured to be inserted along a backside of the connection pad forming surface, and is configured to press the backside so as to press the connection pad forming surface against the edge of the circuit board. Furthermore, in accordance with embodiments of the present invention, the apparatus includes a laser for applying heat to a connection pad of the connector tab and a connection pad on the circuit board while pressing the connection pad forming surface against the edge of the circuit board with the elastic component to be metal-joined. Thus, in accordance with an embodiment of the present invention, in a simple apparatus configuration, the connection pads of the two connector tabs sandwiched between two projections of the circuit board and the connection pads of the circuit board can be securely joined by metal-joining using a simple apparatus and a simple method.

Thus, embodiments of the present invention provide securer interconnection between a connector tab of an HGA and a circuit board, increasing the manufacturing yield of HSAs. Embodiments of the present invention are subsequently described using a hard-disk drive (HDD) taken as an example of a disk drive.

With reference now to FIG. 1, in accordance with an embodiment of the present invention, a plan view is shown that depicts a configuration of a HDD 100. As shown in FIG. 1, mechanical components for HDD 100 are housed in a base 102 of a disk enclosure (DE). Operations of the components in the base 102 are controlled by a control circuit (not shown) on a circuit board affixed outside the base 102 of the disk enclosure (DE). HDD 100 includes a magnetic-recording disk 101, which is a disk for storing data, and a head-slider 105 for accessing the magnetic-recording disk 101. As used herein, "access" is a term of art that refers to operations in seeking a data track of a magnetic-recording disk 101 and positioning a magnetic-recording head on the data track for both reading data from, and writing data to, a magnetic-recording disk 101. The head-slider 105 includes a magnetic-recording head for reading user data from and/or writing user data to the magnetic-recording disk 101, and a slider on which the magnetic-recording head is formed.

An actuator 106 holds the head-slider 105. The assembly of the actuator 106 and the head-slider 105 is referred to by the term of art, "head-stack assembly," or "HSA". In order to access the magnetic-recording disk 101, the actuator 106 pivots on a pivot shaft 107 to move the head-slider 105 in proximity with the recording surface of the spinning magnetic-recording disk 101. A voice coil motor (VCM) 109 drives the actuator 106 as a driving mechanism. The actuator 106 includes components of a suspension 110, an arm 111, a coil support 112, and a VCM coil 113 connected in the order recited from the distal end, where the head-slider 105 is disposed in a longitudinal direction of the actuator 106.

A spindle motor (SPM) 103 affixed to the base 102 spins the magnetic-recording disk 101 at a specific angular rate. A force due to pressure caused by air viscosity between an air bearing surface (ABS) of the head-slider 105 facing the magnetic-recording disk 101 and the spinning magnetic-recording disk 101 balances the load applied by the suspension 110 to the head-slider 105 in the direction toward the magnetic-recording disk 101 so that the head-slider 105 flies in proximity with the recording surface of the magnetic-recording disk 101.

Figure 2:
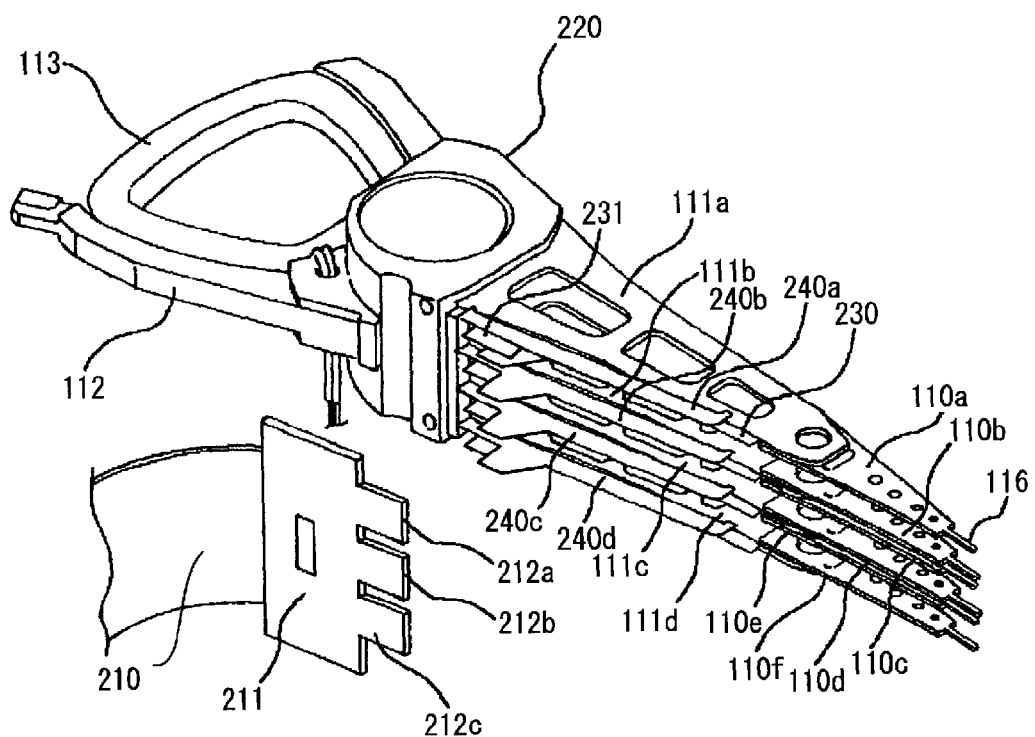
FIG. 2 is a perspective view depicting a configuration of a head-stack assembly (HSA), in accordance with an embodiment of the present invention.

With reference now to FIG. 2, in accordance with an embodiment of the present invention, a perspective view is shown that schematically depicts the structure of a HSA. As used herein, the direction along the actuator pivot shaft 107 is defined as an upward-and-downward direction; and, the direction toward the top cover of HDD 100 is defined as upward, and the direction toward the bottom of the base 102 of the DE is defined as downward. In the actuator 106, the direction toward the suspension when viewed from the pivot shaft 107 is defined as frontward; and, the opposite direction is defined as rearward.

The HSA exemplified in FIG. 2 includes a structure applicable to three magnetic-recording disks 101 that include recording surfaces on both sides of each magnetic-recording disk. The actuator 106 includes four arms 111a to 111d and six suspensions 110a to 110f which are disposed so as to be stacked when viewed in the direction of the pivot axis. To the uppermost arm 111a and the lowermost arm and 111d, suspensions 110a and 110d are secured, respectively. To the respective surfaces of the middle arm 111b, the suspensions 110b and 110c are secured, and to the respective surfaces of the middle arm 111c, the suspensions 110d and 110e are secured. The plurality of arms 111a to 111d is secured to the pivot shaft bearing 220 in a stack.

A wiring structure, which is referred to herein as a "trace," 230 extends rearward from the suspension 110. In FIG. 2, only the trace extending from a suspension 110a is illustratively indicated by a reference numeral. The trace 230 includes a metal layer and conductive leads sandwiched between insulating layers on the metal layer. One end of the trace 230 is connected to connection pads of a head-slider 105. On the other end of the trace 230 that is closer to the pivot shaft 107, a connector tab 231, which is a projection extending in a lateral direction, which is a direction vertical to the pivot axis, of the actuator, is provided. The connector tab 231 includes a plurality of connection pads on the connector tab 231 to be connected to an FPC 210. On the plurality of arms 111a to 111d, support portions 240a to 240d are provided, respectively; each of the support portions 240a to 240d houses and supports the trace 230 extending from the suspension 110.

In the FPC 210, a plurality of conductive leads is arranged separated from each other, and integrated with an insulating sheet made of polyimide films. The FPC 210 is connected to the trace 230 to transmit signals between the head-slider 105 and a control circuit (not shown). An end of the FPC 210 is bonded to a base plate, which is secured to the actuator 106. The base plate and the FPC 210 constitute a circuit board 211. On the circuit board 211, a circuit chip (not shown) including an amplifier circuit is mounted.

On the front end of the circuit board 211, a plurality of projections 212 are formed and slits are provided between the projections 212. On the surface of each projection 212, a plurality of pads is provided that form joints for connecting the circuit board with the wire structure 230. With a connector tab 231 of a trace 230 inserted into a slit, the pads on the projection 212 and the pads formed on the connector tab 231 are interconnected by soldering.

Figure 3:
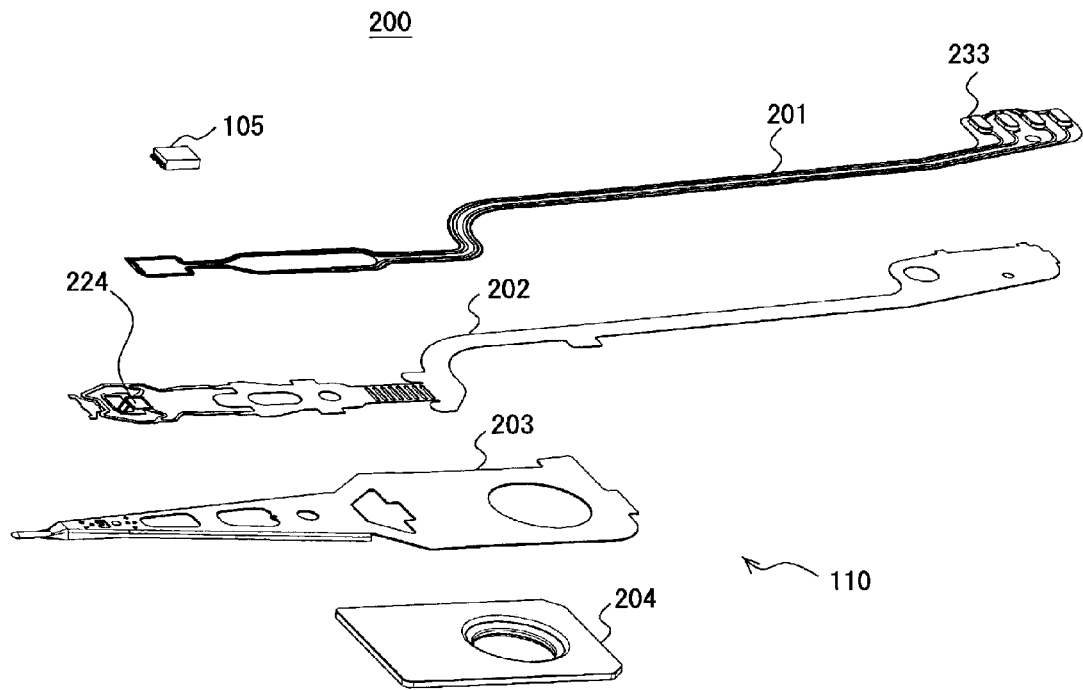
FIG. 3 is an exploded perspective view depicting a configuration of a head-gimbal assembly (HGA), in accordance with an embodiment of the present invention.

With reference now to FIG. 3, in accordance with an embodiment of the present invention, an exploded perspective view is shown that shows components of an HGA 200. HGA 200 includes a suspension 110 and a head-slider 105. The suspension 110 includes: a flexible cable 201, a gimbal 202 comprising a metal layer, a load-beam 203, and a mounting plate 204. A trace 230 includes a portion of the gimbal metal layer 202 and the flexible cable 201 on the gimbal metal layer 202. In this way, the gimbal 202 and the trace 230 are formed integrally. The load-beam 203 is made of, for example, stainless steel in a form of a precision leaf spring. The stiffness of the load-beam 203 is higher than that of the gimbal 202. The load-beam 203 generates a load on the head-slider 105 because of the spring properties of the load-beam 203.

The mounting plate 204 and the gimbal 202 are made of, for example, stainless steel. The gimbal 202 includes a gimbal tongue 224 to which a head-slider 105 is affixed. The gimbal tongue 224, which is supported elastically, holds the head-slider 105 and tilts freely to contribute to attitude control of the head-slider 105.

Figure 4:
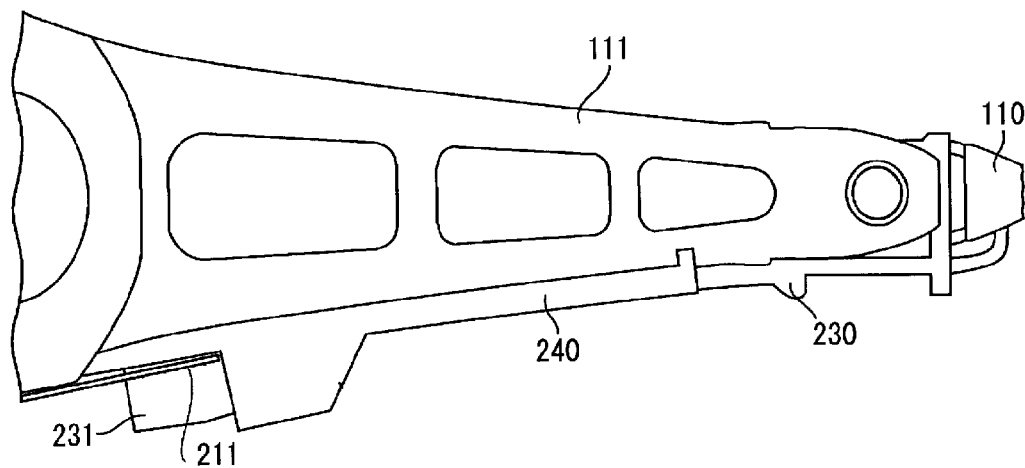
FIG. 4 is a plan view depicting a configuration of a portion of a HSA, in accordance with an embodiment of the present invention.

With reference now to FIG. 4, in accordance with an embodiment of the present invention, a plan view is shown that schematically depicts a portion of the structure of an HSA. As described above, the trace 230 is included of the top of the metal layer 202 and the leads sandwiched between polyimide insulating layers provided on the metal layer. The trace 230 extends from the side of the suspension 110 opposite from the rotational axis of the magnetic-recording disk 101. The trace 230 extending rearward from the gimbal 202 extends along the side of the arm 111, which is the side farther from the center of the magnetic-recording disk 101, toward the pivot shaft 107, which is rearward of the actuator.

At the rear end, which is the end close to the pivot shaft, of the trace 230, a connector tab 231, which is a projection for connecting with the circuit board 211, is formed. The connector tab 231 has a large width, which is larger than that of the other portion in the tail extending rearward from the gimbal body. Referring to FIG. 3, on the tab 231, a plurality of connection pads 233 are provided for solder-joining with the FPC 210; the connection pads 233 are connected with leads of the trace 230. The large width of the connector tab 231 provides effective connection with the circuit board 211.

Figure 5:
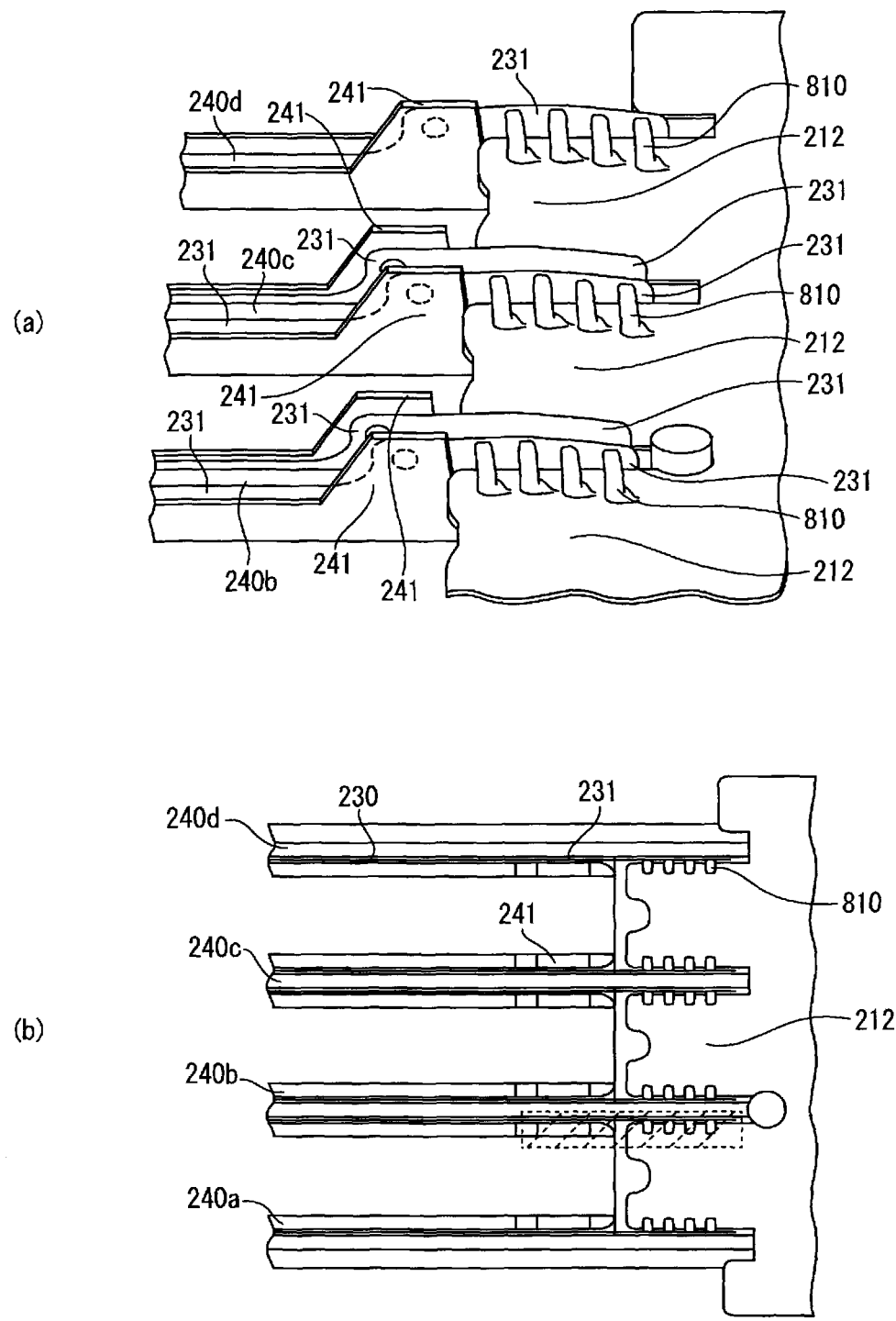
FIGS. 5(a) and 5(b) are drawings schematically depicting a joint portion between connector tabs and a circuit board in the HSA, in accordance with an embodiment of the present invention.

With reference now to FIGS. 5(a) and 5(b), in accordance with an embodiment of the present invention, drawings are shown that illustrate the connections between connector tabs 231 of traces 230 and projections 212 of the circuit board 211. Connection pads formed on the end portion of a projection 212 and the connection pads formed on the surface facing the projection 212 of a connector tab 231 are connected by solder to form joints 810. In each slit between projections 212, connector tabs 231 of two traces supported by a single support member 240 are inserted and disposed. Connection pads formed on the surface facing a projection 212 of each connector tab 231 and connection pads provided on the corresponding end portion of the projection 212 are interconnected by solder.

Four connection pads of a connector tab 231 of a trace 230 and four connection pads of a projection 212 of the circuit board 211 are welded by laser spot welding. In laser spot welding, typically, a laser beam is applied simultaneously to eight connection pads to weld the connection pads. For example, eight connection pads are included in a substantially rectangular laser spot. In one embodiment of the present invention, in solder-joining, a laser beam from excited xenon is used. A method of interconnecting connection pads of a connector tab 231 of a trace 230 and connection pads of the circuit board 211 is next described.

Figure 6:
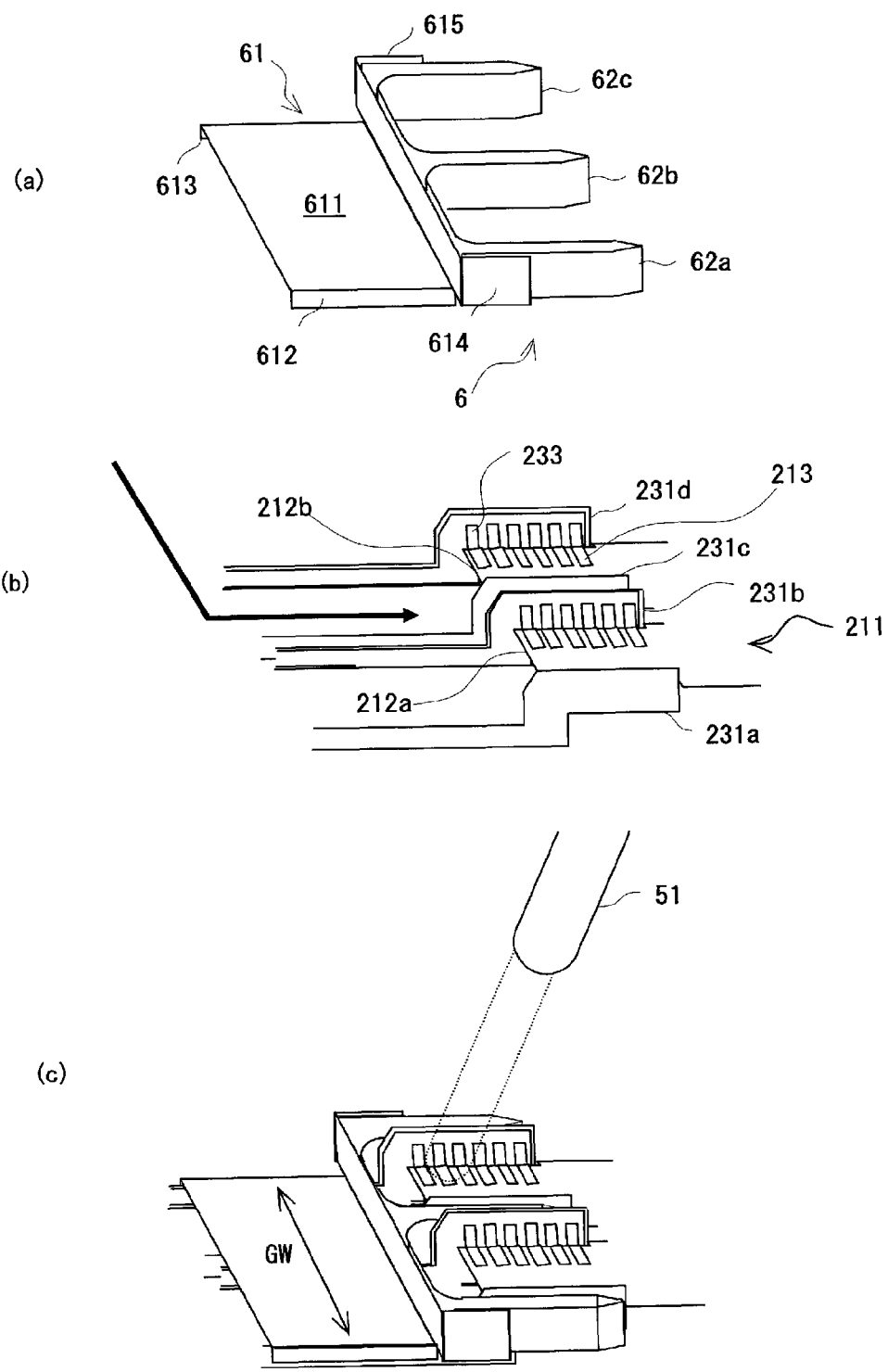
FIGS. 6(a), 6(b) and 6(c) are drawings schematically depicting a structure and usage of a press tool used in joining the connector tabs and the circuit board, in accordance with an embodiment of the present invention.

With reference now to FIGS. 6(a), 6(b) and 6(c), in accordance with an embodiment of the present invention, drawings are shown that schematically depict a structure and a usage of a press tool 6 to be used in joining the connector tabs and the circuit board 211. In accordance with an embodiment of the present invention, in interconnecting connection pads of a connector tab 231 of a trace 230 and connection pads of the circuit board 211, a tool is used to press the connector tab 231 against the circuit board 211 to provide secure interconnection between the connection pads. As shown in FIG. 6(a), the press tool 6 includes a guide 61 and leaf springs 62a to 62c at the rear of the guide 61, for which the directions are based on the directions in the actuator 106. As shown in FIG. 6(b), the method of interconnecting the connector tab 231 and the circuit board 211 slides the press tool 6 along the trace 230 so that the leaf springs 62a to 62c are pressed against the connector tabs 231a to 231d. The leaf springs 62a to 62c press the connector tabs 231a to 231d against the circuit board 211.

Subsequently, as shown in FIG. 6(c), while keeping the connector tabs 231a to 231d pressed against the circuit board 211 with the press tool 6, the method applies a laser beam to the interconnection portions between the connector tabs 231a to 231d and the circuit board 211. In an embodiment of the present invention, the method preliminarily coats the connection pads 233 of the connector tabs 231a to 231d and the connection pads 213 of the circuit board 211 with solder, applies flux to the connection pads 233 of the connector tabs 231a to 231d and the connection pads 213 of the circuit board 211, and then melts the solder by heat of a laser beam from a laser 51, which is a laser light source, to interconnect the connection pads 233 and 213. Solder paste may be used instead of solder coat. Alternatively, the mixture of solder coat and paste may be used. The preceding description is by way of example, as embodiments of the present invention are not limited by the manner of joining of the connection pads.

After completion of the solder-joining, the method removes the press tool 6 from the HSA. The use of the press tool 6 provides interconnection between the connection pads 233 of the connector tabs 231a to 231d and the connection pads 213 of the circuit board 211 by metal-joining. In another embodiment of the present invention, the metal-joining is solder-joining. Solder-joining with connector tabs 231a to 231b pressed against the circuit board 211 by the elastic members provides securer interconnection between the connection pads 233 and 213.

The use of the press tool 6 helps the connection pads 233 of the connector tabs 231a to 231d to make close contact with the connection pads 213 of the circuit board 211 by pressing the backside of the surface with the connection pads 233 of the connector tabs 231a to 231d in the HSA by an elastic force. Thus, in accordance with an embodiment of the present invention, the manufacturing yield of HSAs is increased. Furthermore, the press tool 6 is resistant to build up of metal fatigue so that the press tool 6 is durable for long term use. In addition, the press tool 6 can assist in soldering without drawing much heat of a laser beam from the solder-joint.

FIGS. 6(a) to 6(c) exemplify solder-joining in an HSA with three arms and four HGAs implemented. The connector tab 231a is the connector tab of the HGA secured at the uppermost layer. The connector tabs 231b, 231c, and 231d are connector tabs of the HGAs at the second layer, the third layer, and the lowermost layer, respectively. The connector tabs 231b and 231c are the connector tabs of the HGAs that are secured to the same arm in the middle.

Figure 8:
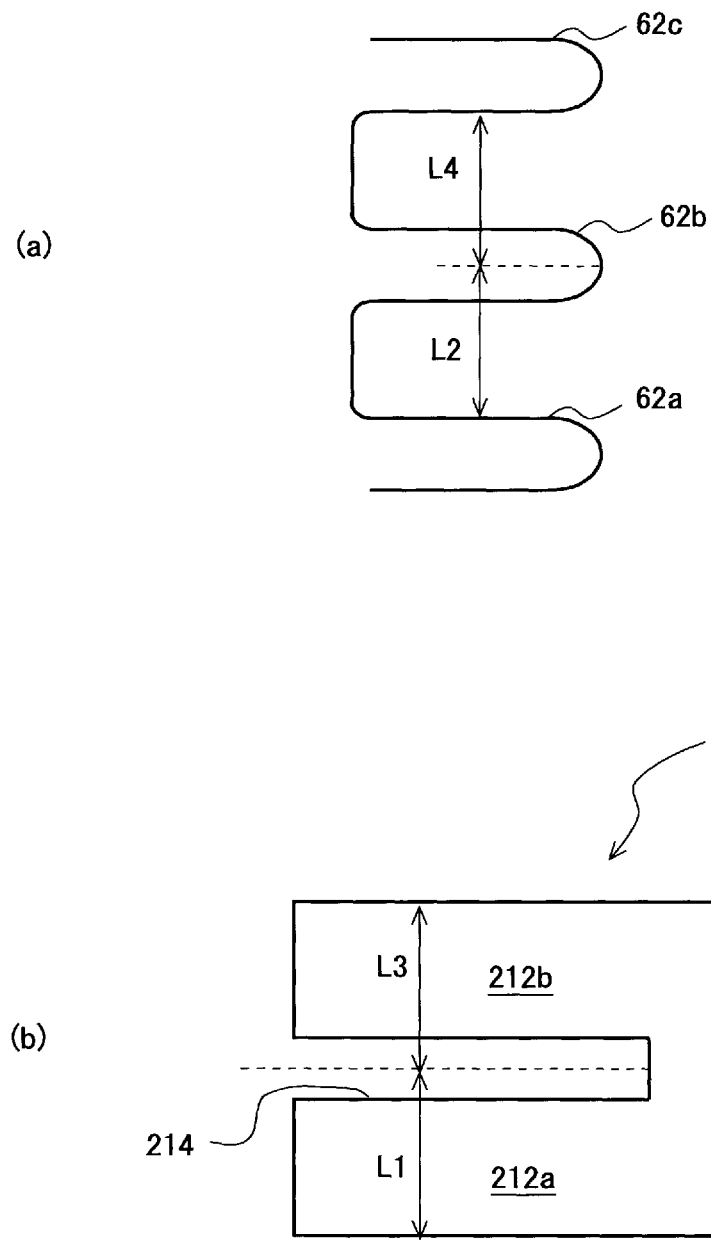
FIGS. 8(a) and 8(b) are drawings schematically illustrating a dimensional relationship between the leaf spring and the circuit board in the press tool, in accordance with an embodiment of the present invention.

As shown in FIGS. 6(b) and 6(c), the circuit board 211 includes two projections 212a and 212b and a slit 214 (refer to FIG. 8). As explained with reference to FIG. 5, the projections 212a and 212b extend along the side of an arm 111 toward the front of the actuator. The projections 212a and 212b are arranged in the direction parallel to the actuator pivot shaft 107. On the respective upper sides and the lower sides of the projections 212a and 212b, connection pads are provided in a fore-and-aft direction. In the example in FIGS. 6(b) and 6(c), six connection pads 213 c are arranged along a line extending in the front- and rear direction and this line is associated with a single connector tab, for example, one of connector tabs 231b and 231d as shown in FIGS. 6(b) and 6(c).

As shown in FIG. 6(b), the connector tabs 231a to 231d of the traces extending from the front toward the rear of the arms 111 are arranged so as to overlap with the circuit board 211 when viewed in an upward-and-downward direction. Specifically, the connector tab 231a is placed higher than the projection 212a and the connector tabs 231b and 231c are placed within the slit 214. The connector tab 231d is placed lower than the projection 212b. The connector tabs 231a and 231b sandwich the projection 212a, and the connector tabs 231c and 231d sandwich the projection 212b.

As to the connector tabs 231a to 231d, the main faces, which are the broadest faces, on which their connection pads 233 are provided are placed so as to face the edges of the projections 212a and 212b of the circuit board 211. In other words, the main faces, which are the broadest faces, of the projections 212a and 212b on which their connection pads 213 are provided are placed so as to intersect with the main faces, which are the broadest faces, of the connector tabs 231a to 231d at predetermined angles, which are typically at right angles. On the connector tabs 231a to 231d, connection pads are arranged along a line extending in a fore-and-aft direction. Such an arrangement of the connector tabs 231a to 231d and the projections 212a and 212b allows the connection pads 233 of the connector tabs 231a to 231d to face the connection pads 213 of the projections 212a and 212b at predetermined angles, which are typically at right angles.

The connection pads 233 are formed on the main faces of the connector tabs 231a to 231d facing the projections 212a and 212b. Specifically, the pad forming face of the connector tab 231a is in contact with the upper edge of the projection 212a. The pad forming face of the connector tab 231b is in contact with the lower edge of the projection 212a. The pad forming face of the connector tab 231c is in contact with the upper edge of the projection 212b, and the pad forming face of the connector tab 231d is in contact with the upper edge of the projection 212b.

The press tool 6 presses the connector tabs 231a to 231d against the projections 212a and 212b having the above-described positional relationship between the projections 212a and 212b. As shown in FIG. 6(c), the uppermost leaf spring 62a presses the connector tab 231a against the projection 212a. The middle leaf spring 62b presses the connector tabs 231b and 231c against the projections 212a and 212b, respectively. The lowermost leaf spring 62c presses the connector tab 231d against the projection 212b. The leaf springs 62a to 62c make contact with and press the back faces of the pad forming faces of the connector tabs 231a to 231d.

The guide 61 of the press tool 6 contacts with the arm 111 of the HSA. The guide 61 includes a main plate 611 and side plates 612 and 613 which are perpendicular to the main plane. In the width direction of the main plate 611, the leaf springs 62a to 62c are provided. When the press tool 6 is attached to an HSA, the width GW of the main plate 611 corresponding to the height of the guide 61. The width GW of the main plate 611 has the same dimension as the distance from the top surface of the uppermost arm to the under surface of the lowermost arm of the HSA.

In attachment of the press tool 6, the back surface of the main plate 611 contacts the edges of the arms, and the side plates 612 and 613 contact the uppermost arm and the lowermost arm, respectively, to guide the sliding direction of the press tool 6. Thus, in accordance with an embodiment of the present invention, the guide 61 provided for the press tool 6 allows easy setting of the press tool 6 at a predetermined position in the solder-joining operation in manufacture of a HSA.

The press tool 6 includes leaf springs 62a to 62c. The guide 61 and the leaf springs 62a to 62c are disposed in the fore-and-aft direction of the actuator. Assuming that the insertion direction of the press tool 6 is frontward, the guide 61 is behind the leaf springs 62a to 62c. In the example configuration shown in FIGS. 6(a), 6(b) and 6(c), the leaf springs 62a to 62c are formed of a single metal plate. Bending a single plate to form a plurality of leaf springs 62a to 62c enables the press tool 6 to be formed easily and with a small number of components. The leaf springs 62a to 62c have elastic force to extend outward and are held between the side walls 614 and 615 of the guide 61. The structures of the leaf springs 62a to 62c is next described. Since leaf springs 62a to 62c have the same structure, the structure of the leaf springs 62b is specifically described next with reference to FIGS. 7(a), 7(b) and 7(c).

Figure 7:
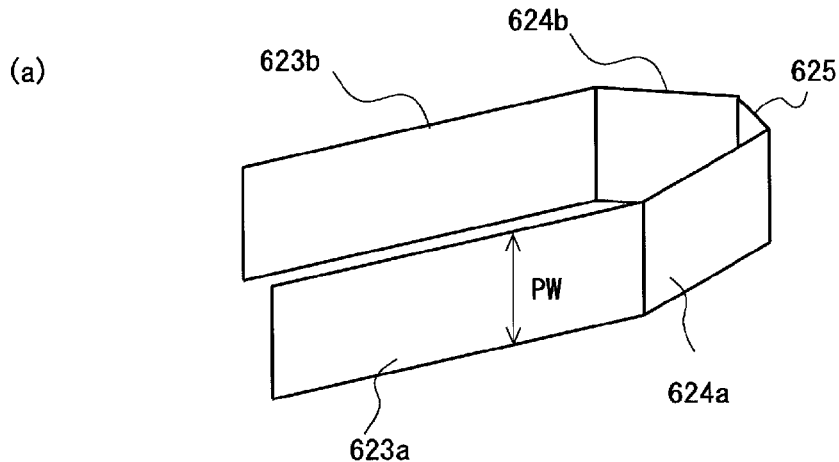
FIGS. 7(a), 7(b) and 7(c) are drawings schematically depicting a structure of a leaf spring in the press tool, in accordance with an embodiment of the present invention.
Figure 7:
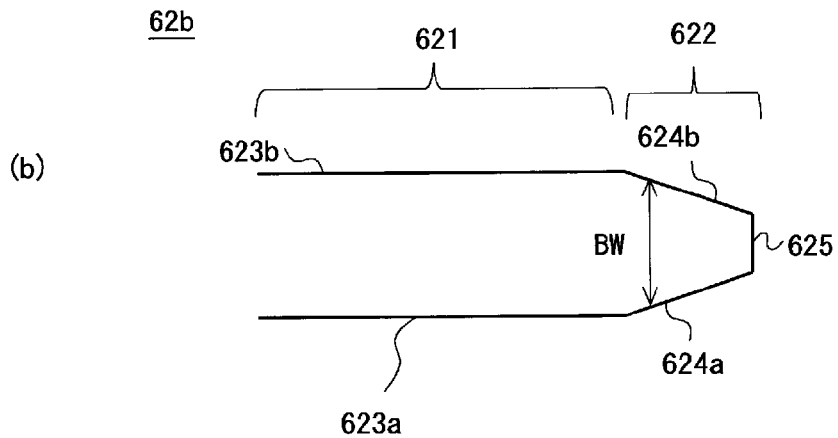
Figure 7:
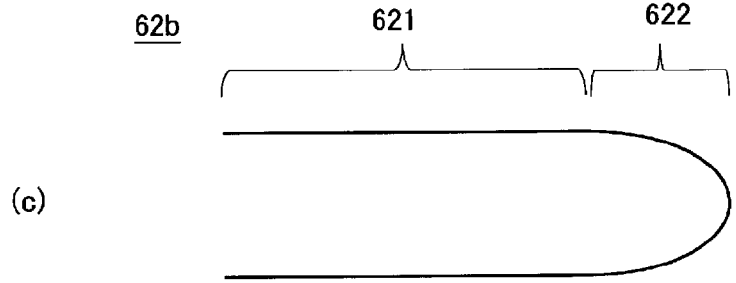

With reference now to FIGS. 7(a), 7(b) and 7(c), in accordance with an embodiment of the present invention, drawings are shown that schematically depict a structure of a leaf spring in the press tool. FIGS. 7(a) and 7(b) are a perspective views and a top plan view, respectively, schematically depicting the structure of the leaf spring 62b. The leaf spring 62b is U-shaped and the spring width BW of the leaf spring 62b becomes smaller toward the tip. The leaf spring 62b includes a main portion 621 and a tip 622. The tip 622 is located frontward in the sliding direction in attachment to an HSA. With reference to the actuator, the tip 622 is located at the rear of the main portion 621.

The main portion 621 includes two main-plate portions 623a and 623b, which are flat. The main-plate portions are disposed in parallel to each other and the spacing between the main-plate portions is uniform. The tip 622 includes tapered portions 624a and 624b joined with the main-plate portions 623a and 623b, respectively, and an end-plate portion 625 connecting the tapered portions. The main-plate portions 623a and 623b, the tapered portions 624a and 624b, and the end-plate portion 625 have the same plate width PW. Namely, the leaf springs 62a to 62c are made of a metal plate having a uniform width.

The spacing between the tapered portions 624a and 624b becomes smaller toward the end uniformly. The tapered portions 623a and 624b, and the end-plate portion 625 are flat, and corners, which are bends, are formed between the tapered portion 624a and the main-plate portion 623a, the tapered portion 624b and the main-plate portion 623b, the tapered portion 624a and the end-plate portion 625, and the tapered portion 624b and the end-plate portion 625. As shown in FIG. 6(c), the plate surfaces of the main-plate portions 623a and 623b contact and press the plate surfaces of the connector tabs 231b and 231c, respectively.

Prior to insertion, the spring width BW of the main-plate portions 623a and 623b is larger than the slit width of the slit 214 in the circuit board 211. Moreover, the width of the distal end of the leaf spring 62b, namely the width of the end-plate portion 625, which is the dimension in the spring width direction, is smaller than the slit width. More specifically, the width of the distal end is smaller than the spacing between the connector tabs 231b and 231c disposed within the slit 214. This structure allows the leaf spring 62b to be smoothly inserted between the connector tabs 231b and 231c and allows the connector tabs 231b and 231c to be pressed properly against the projections 212a and 212b.

If the leaf spring 62b has bends like the example shown in FIGS. 7(a) and 7(b), the leaf spring 62b may be more likely to be broken because of stress concentration at the bends. In another embodiment of the present invention, the tip 622 of the leaf spring 62b is configured with a curve. Thus, in accordance with an embodiment of the present invention, even in the similar U-shaped leaf springs, the rounded tip 622 can increase the durability of the leaf spring 62b. Rounding the tips of the leaf springs 62a to 62c provides a curvature radius of a nonzero value at the tips. This structure can disperse the strain which is generated at the curve by deformation at the time of insertion of the leaf spring. This prevents concentration of the strain on a bend, which delays fatigue fracture at the bend in repetitive use of the leaf spring.

In another embodiment of the present invention, the curvature radius at the tip is at least 0.05 mm, or more. If the curvature radius at the tip is less than that, the curve may become excessively loaded and is more likely to fracture. In another embodiment of the present invention, the curvature radius in the leaf spring 62b is below a half of the slit width, which provides the connector tabs 231b and 231c with appropriate elastic force.

With reference now to FIGS. 8(a) and 8(b), in accordance with an embodiment of the present invention, drawings are shown that schematically illustrate a dimensional relationship between the leaf spring and the circuit board 211 in the press tool 6. To elastically press all of the connector tabs 231a to 231d, the positional relationship among the leaf springs 62a to 62c is taken into consideration. While the press tool 6 is inserted as shown in FIG. 6(c), the spring widths of all the springs 62a to 62c are contracted. Hence, as shown in FIGS. 8(a) and 8(b), the length L1 from the middle of the slit 214 to the upper edge, which is the outer edge, of the projection 212a is larger than the length L2 from the middle of the leaf spring 62b to the inner main plate portion, which is the surface facing the leaf spring 62b, of the leaf spring 62a. In addition, the length L3 from the middle of the slit 214 to the lower edge, which is the outer edge, of the projection 212b is larger than the length L4 from the middle of the leaf spring 62b to the inner main plate portion, which is the surface facing the leaf spring 62b, of the leaf spring 62c.

Figure 9:
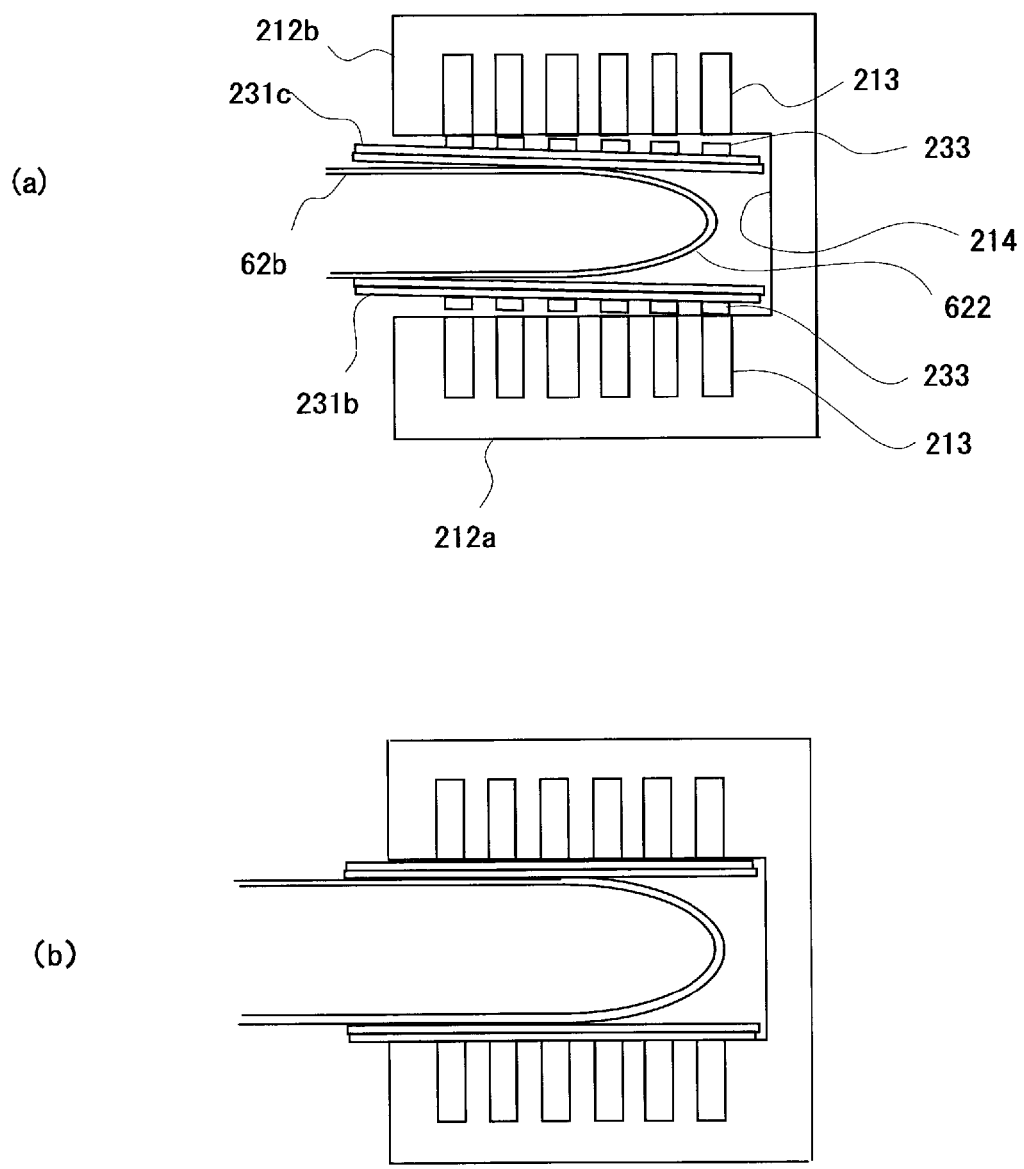
FIGS. 9(a) and 9(b) are drawings illustrating the operation of the leaf spring in the press tool for pressing connector tabs, in accordance with an embodiment of the present invention.

With reference now to FIGS. 9(a) and 9(b), in accordance with an embodiment of the present invention, drawings are shown that illustrate the operation of the leaf spring in the press tool for pressing connector tabs. FIGS. 9(a) and 9(b) schematically illustrate the leaf spring 62b before and after solder-joining. In the present example, the tip 622 of the leaf spring 62b is rounded. When the leaf spring 62b is inserted into the slit 214, a portion of the connection pads of the connector tabs 231b and 231c are in contact with the connection pads 213 of the circuit board 211; but, the other portion of the connection pads are not in contact with the connection pads 213 of the circuit board 211. Consequently, not all of the connection pads may be in contact with corresponding ones because of errors in manufacture or assembling, and differences between components. The gap between connection pads tends to be larger particularly in the case that the connection pads are coated with solder, because the coating solder may have variations in shape and thickness.

When the connection pads 213 and 233 are heated by a laser beam, solid solder gets molten. As shown in FIG. 9(b), the connector tabs 231b and 231c pressed by the leaf spring 62b are deformed to make the connection pads 233 closely contact the connection pads 213. If the laser heating is stopped, molten solder hardens to join the connection pads 213 and 233. In this way, in soldering, pressing the backsides of the connection pad forming surfaces of the connector tabs 231b and 231c by an elastic force assists in contact of the connection pads 233 of the connector tabs 231b and 231c closely to the connection pads 213 of the circuit board 211.

In another embodiment of the present invention, for the leaf spring 62b to press the connector tabs 231b and 231c more evenly, the respective contact areas between the leaf spring 62b and the connector tabs 231b and 231c after solder melting reach the middle of the arranged connection pads 233, or even deeper within the slit. Furthermore, in another embodiment of the present invention, the tip of the leaf spring 62b is somewhat removed from the bottom of the slit 214. Thus, in accordance with an embodiment of the present invention, even if variations in insertion position of the leaf spring 62b exist, appropriate pressure by the leaf spring 62b can be attained. The leaf spring 62b has the same structure as the leaf springs 62a and 62c. Therefore, the above description for the leaf spring 62b can be applied to the leaf springs 62a and 62c. The difference between the leaf spring 62b and the leaf springs 62a and 62c is whether a connector tab that is arranged to be pressed is provided on each side of the leaf spring, or alternatively, on one side of the leaf spring.

When the leaf spring 62b is inserted into the narrow space of 0.3 mm to 0.7 mm between the two connector tabs 231b and 231c, the leaf spring 62b bent into a U-shape can easily push aside the two connector tabs 231b and 231c. Moreover, the leaf springs 62a to 62c by having appropriate spring elasticity can make the connector tabs 231a to 231d flat in soldering.

The leaf springs 62a to 62c are made of a metallic material with high heat resistance and high elasticity, such as: stainless steel, bainitic steel, ribbon steel, or phosphor bronze. For sufficient resistance to the laser heating, in another embodiment of the present invention, a metallic material having melting point of 300° C. or higher is used. In another embodiment of the present invention, the plate thickness of the leaf springs 62a to 62c is at most 0.1 mm, or less. The material in thickness of at most 0.1 mm, or less, allows the spring portion to be deformed by a small force. Most of the deformations described above are not plastic deformations, but lie within the range of elastic deformation, so the spring can recover into almost the original shape of the spring when the force is removed. While the leaf springs 62a to 62c are deformed by contact with the connector tabs 231a to 231d, namely at least while the soldering is being performed, the leaf springs 62a to 62c can apply pressing force to the connector tabs 231a to 231d continuously.

Since the spring members do not undergo plastic deformation, the spring members are difficult to fatigue, which delays fatigue fracture of the spring members in repetitive use of the leaf springs. If the material plate is at most 0.03 mm, or less, in thickness, handling after shaping into a spring member is difficult; and, the spring member can become easily deformed by an accidentally applied external force, causing a problem in durability. In another embodiment of the present invention, the plate thickness of the spring material is from 0.03 mm to 0.1 mm.

If the plate thickness of the material is at most 0.1 mm, or less, the heat capacity of the leaf springs 62a to 62c, which are in contact with the connector tabs 231a to 231d can be reduced in soldering with a the heat from the laser beam applied in proximity of the connection pads 213 and 231. Then, soldering failures, such as, unmelting, and shortness of wettability, can be reduced, which may be caused by the spring members drawing heat away from the connector tabs 231a to 231d.

For the same reason, in another embodiment of the present invention, the guide portion 61, which is the body for supporting the leaf springs 62a to 62c, is formed by bending a thin metal plate, because a thin plate member reduces the heat capacity of the press tool, preventing the tool from absorbing the amount of heat supplied from a heat source in soldering.

As shown in FIG. 9(a), when the leaf spring 62b is inserted into the slit 214, which is between the connector tabs 231b and 231c, the curve at the tip of the leaf spring 62b receives a heavy load, which is also true of the leaf springs 62a and 62c. In another embodiment of the present invention, an auxiliary spring mechanism is provided to each of the leaf springs 62a to 62c. Specifically, to at least one of the main plate portions 623a and 623b provided in parallel, an auxiliary spring mechanism is added. The auxiliary spring mechanism added to the flat portions 623a and 623b of a leaf spring increases the durability of the leaf spring.

When the leaf spring 62b is inserted into the gap between the two connector tabs 231b and 231c, the leaf spring 62b receives a force in the direction pushing the leaf spring 62b away from the two connector tabs 231b and 231c. Under circumstances of repeated use, the tip 622 of the leaf spring repeatedly receives and relaxes from a heavy strain with repeated elastic deformation, so that the tip 622 of the leaf spring may be more likely to build up fatigue. Thus, the tip 622 is likely to develop microscopic cracks.

The force to press the connector tabs 231b and 231c is not reduced with prolonged usage; and, the leaf spring may ultimately fracture in due course. The auxiliary spring mechanism added to the flat portions 623a and 623b of the leaf spring can remove most of the force pressing the connector tabs 231b and 231c. The removal of this force produces less deformation of the leaf spring 62b, so the leaf spring 62b becomes more resistant to fatigue, resulting in delayed fatigue fracture of the leaf spring with repetitive use of the leaf spring 62b.

Figure 10:
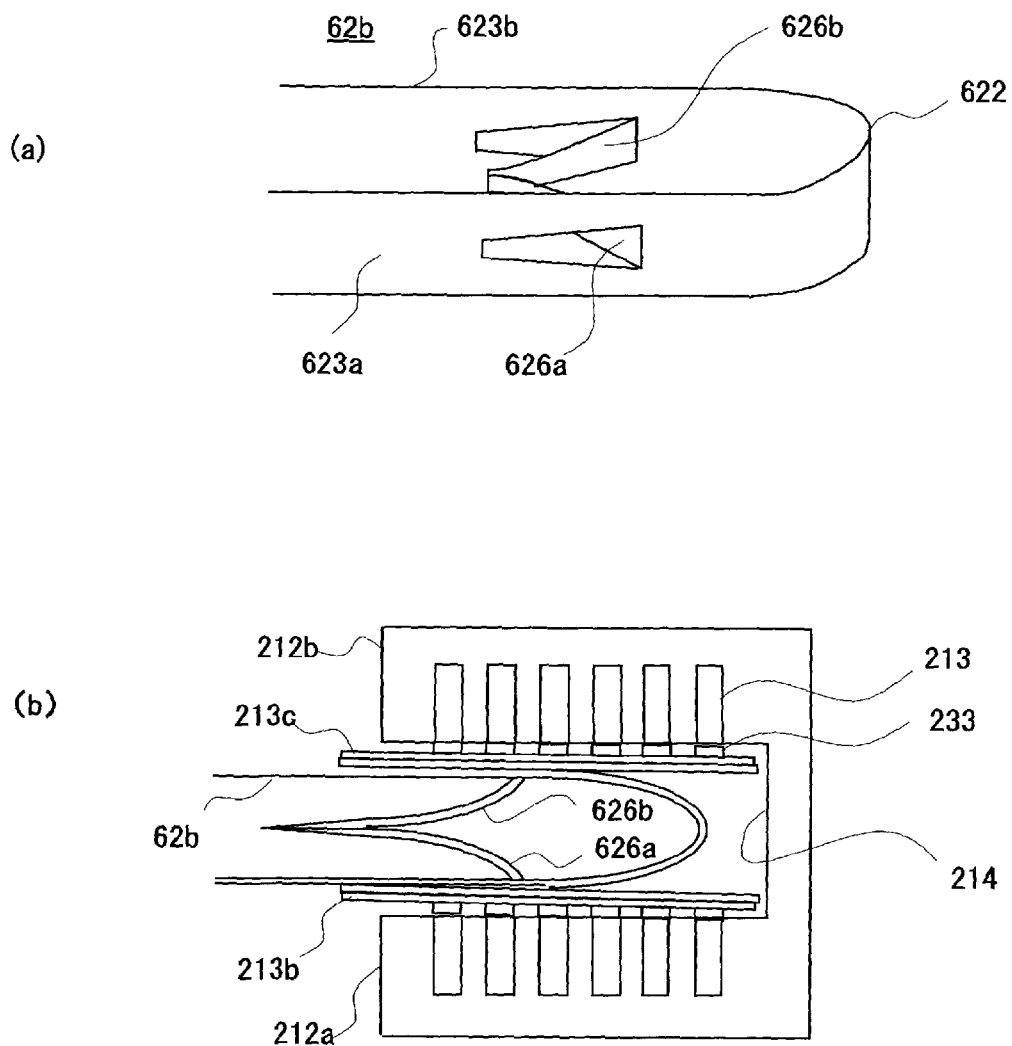
FIGS. 10(a) and 10(b) are drawings schematically depicting a structure of another example of a leaf spring in the press tool, in accordance with an embodiment of the present invention.
Figure 11:
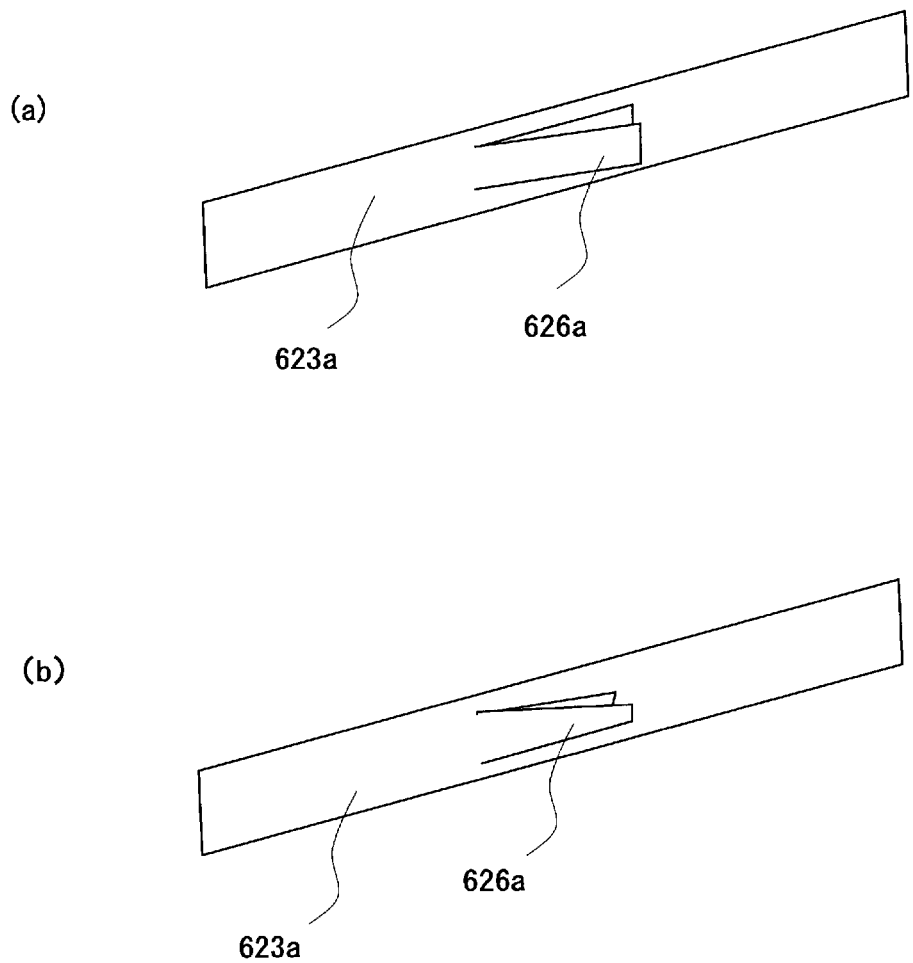
FIGS. 11(a) and 11(b) are drawings each schematically depicting a portion of a structure of a leaf spring including an auxiliary spring mechanism in the press tool, in accordance with an embodiment of the present invention.

With reference now to FIGS. 10(a) and 10(b), and FIGS. 11(a) and 11(b), in accordance with embodiments of the present invention, in FIGS. 10(a) and 10(b), drawings are shown that schematically illustrate a structure of an auxiliary spring mechanism in the press tool 6; and, in FIGS. 11(a) and 11(b), drawings are shown that each schematically depict a portion of a structure of a leaf spring including an auxiliary spring mechanism in the press tool 6. By way of example, the leaf spring 62b is next described; but, the following description is also applicable to the other leaf springs. An auxiliary spring mechanism includes two plates 626a and 626b pressing and supporting each other. The two plates 626a and 626b are leaf springs having spring properties. The plate 626a is formed on the main plate portion 623a and the plate 626b is formed on the main plate portion 623b. In one embodiment of the present invention, the plates 626a and 626b are quadrangular and the widths become smaller toward their distal ends in the example shown in FIGS. 10(a) and 10(b). More specifically, the plates 626a and 626b have trapezoidal shapes whose distal ends are narrower than the proximal ends. In one embodiment of the present invention, the plates 626a and 626b have the same shape, by way of example without limitation thereto, as the plates 626a and 626b may have different shapes.

The main plate portions 623a and 623b are cut in squared U-shapes in the middle; and, the cut portions are bent inward of the leaf spring 62b to form the plate 626a and 626b. This structure is simplest for the method of forming the auxiliary spring mechanism because the leaf spring 62b does not utilize a large area to form an auxiliary spring mechanism, and the auxiliary spring mechanism can be obtained through a single bending operation applied to one plate.

In an embodiment of the present invention, as shown in FIGS. 10(a) and 10(b), the plates 626a and 626b make plane to plane contact with each other. Contact of the inner surfaces positioned opposite to each other, rather than at the distal edges of the plates 626a and 626b, prevents generation of particulate debris. In an embodiment of the present invention, the plates 626a and 626b are formed within the areas, which make contact with the connector tabs, in the main plate portions 623a and 623b. Since the plates 626a and 626b do not make contact with the connector tabs, the plates 626a and 626b can reduce the thermal conductance from the connector tabs to the leaf spring upon application of heat from the laser beam around the connection pads of the connector tabs and the connection pads of the circuit board 211 for soldering; consequently, soldering failures, such as, unmelting of solder, and insufficient wettability, which may be caused by the leaf spring drawing heat from the connector tabs, can be reduced.

As shown in FIG. 11(b), the plate 626a has a larger width at a base of the plate 626a and the width becomes progressively narrower toward the distal end, which is similar to the plate 626b shown in FIG. 10(a). If the auxiliary spring mechanism is formed to have such a structure and receives a certain load, stress concentration in the vicinity of the base can be prevented, which otherwise might cause plastic deformation. In other words, the structure provides for elastic deformation of the auxiliary spring mechanism and of the vicinity of the base of the auxiliary spring mechanism. In contrast with an auxiliary spring mechanism configured with rectangular plates 626a and 626b, plastic deformation is likely to occur because stresses are concentrated at the vicinity of the bases of the plates 626a and 626b.

Even though a leaf spring may undergo application of a heavy load during insertion of the leaf spring, soldering, and removal of the leaf spring, such an auxiliary spring mechanism provides for elastic deformation for most of the plate spring; consequently, metal fatigue is more difficult to build up and high durability can be assured. In the examples in FIGS. 10(a), 10(b), 11(a) and 11(b), the plates 626a ad 626b constituting the auxiliary spring mechanism protrude toward the guide, but the protruding direction may be opposite to that shown. Alternatively, in another embodiment of the present invention, to decrease the plate widths of the plates 626a and 626b toward the distal end, the end edges of the plates 626a and 626b may not be straight, but may be curved, unlike the above-described examples.

Figure 12:
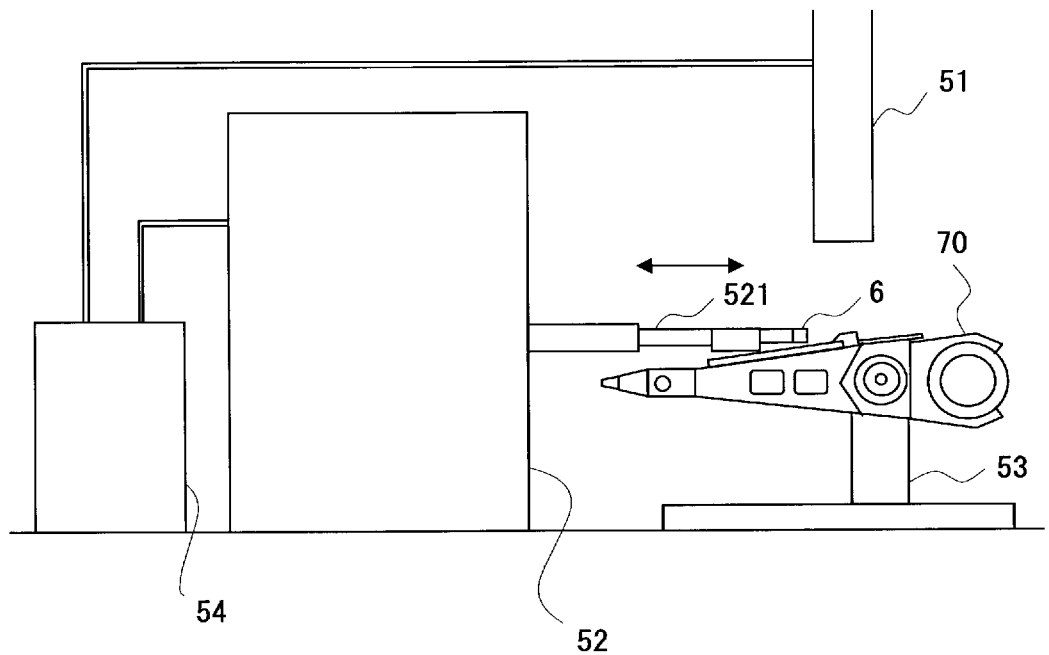
FIG. 12 is a drawing schematically depicting a configuration of a soldering apparatus, which is a manufacturing apparatus for performing metal-joining in the HSA, in accordance with an embodiment of the present invention.

With reference now to FIG. 12, in accordance with an embodiment of the present invention, a drawing is shown that schematically depicts a configuration of a soldering apparatus 5, which is a manufacturing apparatus to perform metal-joining in the HSA. The solder-joining apparatus 5 includes a laser 51, a press tool handler 52 for operating the press tool 6, a support platform 53 for supporting HSA 70, and a controller 54 for controlling operation of the solder-joining apparatus 5. In manufacturing HSA 70, HSA 70 is set on and affixed to the support platform 53.

The press tool handler 52 includes an arm 521, and at an end of the arm, the press tool 6 is secured. The arm 521 is extendable in the fore-and-aft direction; the arm 521 extends to insert the press tool 6 into HSA 70 for solder-joining the connector tabs and the circuit board. After the completion of the solder-joining, the arm 521 retracts to remove the press tool 6 from HSA 70.

The tool handler 52 controlled by the controller 54 slides the press tool 6 toward HSA 70 using the arm 521. As explained with reference to FIG. 6, the guide 61 of the press tool 6 slides in contact with the side of the arm of HSA 70 to insert the leaf springs into HSA 70. Specifically, the leaf springs are slid so as to be located between the middle connector tabs, and outside the uppermost and the lowermost connector tabs.

When the press tool 6 and the arm 521 stops and is set to an appropriate position in HSA 70, the controller 54 controls the laser 51 to begin irradiation with a laser beam of the connection pads of the connector tabs and the circuit board. The heat of the laser beam melts the solder to interconnect the connection pads without direct contact. After predetermined time has passed, the controller 54 stops the laser beam irradiation with the laser 51 and waits for another predetermined time. Thus, in accordance with an embodiment of the present invention, the molten solder hardens to interconnect the connection pads of the connector tabs and the circuit board by soldering.

The controller controls the tool handler 52 to remove the press tool 6 from HSA 70 after a predetermined time period. Specifically, the tool handler 52 retracts the arm 521 to slide the press tool 6 in the direction away from HSA 70 for removing the press tool 6 from HSA 70. On the support platform 53, another HSA is set and solder-joining is repeated on another HSA.

A solder-joined HSA 70 is removed from the support platform 53 and sent to an assembly operation of HDD 100. The assembly operation of HDD 100 mounts an SPM 103 and magnetic-recording disks 101 on a base 102 and then affixes HSA 70 within the base. The assembly operation of HDD 100 mounts components, such as: a VCM 109, a ramp, connectors for a control circuit board, and other HDD components; and, the assembly operation of HDD 100 then secures a top cover to the top of the base 102 of the DE. Thus, in accordance with an embodiment of the present invention, the assembly operation of a head-disk assembly (HDA) is completed. Then, the HDA is subjected to a servo write operation and a test operation; and, assembly of HDD 100 with the HDA including a control circuit board is completed.

Figure 13:
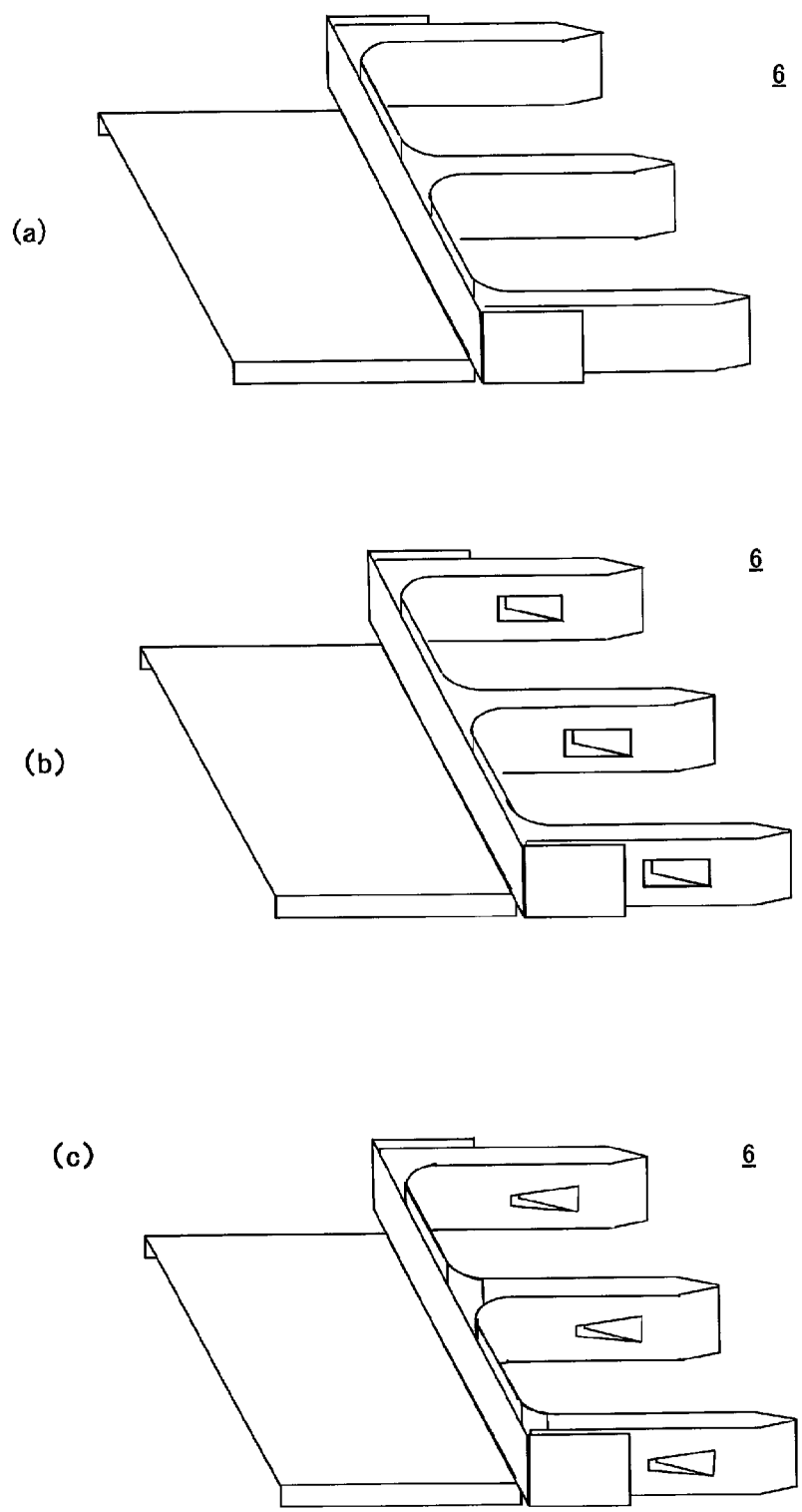
FIGS. 13(a), 13(b) and 13(c) are drawings schematically depicting the structures of the press tools used in measurement, in accordance with an embodiment of the present invention.

With reference now to FIGS. 13(a), 13(b) and 10(b), in accordance with an embodiment of the present invention, drawings are shown that schematically depict the structures of the press tools used in measurement. A plurality of different types of press tools having the leaf spring structure of the present example were prepared and subjected to actual solder-joining. The leaf springs were made of stainless steel (SUS304) to have 0.05 mm in plate thickness, and 2 mm in plate width. The curve at the tip of the leaf spring was made to have 0.1 mm of curvature radius. To compare the performance of the press tools, press tools having different shapes were prepared as follows:

Press tool A: No auxiliary spring mechanism was provided to the leaf spring (see FIG. 13(a)).

Press tool B: An auxiliary spring mechanism was additionally provided to each of the leaf springs, by forming squared U-shaped cuts having 0.6 mm in width and 1.8 mm in length in the flat portions of the leaf spring on the both sides and bending the U-shape portions inward at the bases of the U-shape portions (see FIG. 13(b)).

Press tool C: An auxiliary spring mechanism was additionally provided to each of the leaf spring, by forming squared U-shaped cuts having 0.8 mm in width at the base, 0.2 mm in width at the distal end, and 1.8 mm in length in the flat portions of the leaf spring on the both sides and bending the U-shape portions inward at the bases of the U-shape portions (see FIG. 13(c)).

No use of a press tool.

Soldering performances were compared among the above-described four shapes, using 100 HSAs under each condition, 400 HSAs in total. As a result of soldering, the counts of arm assemblies which developed failure in soldering were as follows:

No use of a press tool: 5
Press tool A: 2
Press tool B: 0
Press tool C: 0

These results show that, in accordance with embodiments of the present invention, the attachment of the press tool can reduce soldering failures. In addition, the auxiliary spring mechanism on the flat portion of the leaf spring can further reduce soldering failures by increasing the force pressing a connector tab.

In addition, through an experiment that repeated the attachment and the removal of the press tools A to C to and from a HSA, the jigs developed fractures at a point where the tip of the leaf spring was bent into a U-shape in the following order from greater frequency to lesser frequency: press tool A, press tool B, and press tool C. The durations were approximately 1:1.2:1.4. Accordingly, an auxiliary spring mechanism added to the flat portion of the leaf spring prevents stress concentration at the point bent into a U-shape in the tip of the leaf spring.

Moreover, the bases of the added auxiliary spring mechanisms were observed for press tools B and C. The press tool B had cracks; but, the press tool C did not. This result shows that the auxiliary spring mechanism having a wide base and a narrower end portion prevents stress concentration in the vicinity of the auxiliary spring mechanism.

As set forth above, embodiments of the present invention have been described by way of examples; but, embodiments of the present invention are not limited to the above-described examples, as embodiments of the present invention can, of course, be modified, added to, and/or elements of the examples converted in various ways within the spirit and scope of embodiments of the present invention. For example, in the above-described press tool, a component for elastically pressing connector tabs may be made of elastic material such as resin, or alternatively, a combination of resin and metal. However, in one embodiment of the present invention, the component for elastically pressing connector tabs is made of metal alone to reduce generation of particulate debris. For example, in another embodiment of the present invention, to reduce the load at the tip of the leaf spring, the above-described rounded tip is utilized for the performance and the ease of shaping; but, a column-like portion may be provided at the tip and a plate having spring properties may be affixed to the column-like portion to reduce the load and the possibility of breaking at the tip. For example, in another embodiment of the present invention, the circuit board may be formed by a FPC and a support plate, but may also be formed by a resin board with circuit wiring printed on a resin board, such as, an epoxy board. For example, to ensure the handling and the size of connection pads, in another embodiment of the present invention, the connection pads are wide, but may have narrow widths like the tail portion of the trace if permitted by the design. For example, in yet another embodiment of the present invention, the press tool is attached to or removed from an HSA with an apparatus; but, this operation may also be performed manually.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An interconnection apparatus for a head-stack assembly, said apparatus comprising:
   a support platform for supporting a head-stack assembly, said head-stack assembly comprising:
      an arm;
      a suspension secured to a distal end of said arm;
      a head-slider held by said suspension;
      a trace in which leads, which extend from said suspension for transmitting a signal to a magnetic-recording head, are formed on a metal layer; and
      a circuit board, wherein a connection pad forming surface of a connector tab formed on an end of said trace is opposed to an edge of said circuit board;
   a press tool comprising:
      an elastic portion configured to be inserted along a backside of said connection pad forming surface and configured to press said backside so as to press said connection pad forming surface against said edge of said circuit board;
   a laser for applying heat to a connection pad of said connector tab and a connection pad on said circuit board while said connection pad forming surface is pressed against said edge of said circuit board with said elastic portion to be metal-joined;
   said circuit board of said assembly comprises two projections;
   each of connection pad forming surfaces of two connector tabs which are inserted between said two projections is opposed to each of edges of said two projections;
   said elastic portion is configured to be inserted between backsides of said connection pad forming surfaces of said two connector tabs while keeping in contact with said backsides, and is configured to press said backsides so as to press each of said connection pad forming surfaces of said two connector tabs against each of said edges of said two projections, wherein said elastic portion is a U-shaped leaf spring and wherein said leaf spring comprises two plate portions joining with said tip and provided in parallel; and, an auxiliary spring mechanism is formed on at least one of said plate portions; and
   said laser is configured to apply a laser beam to connection pads of said two connector tabs and connection pads on said circuit board while said elastic portion is pressing each of said connection pad forming surfaces against each of said edges of said two projections.

2. The interconnection apparatus of claim 1, wherein a tip of said leaf spring is formed with a curve.

3. The interconnection apparatus of claim 2, wherein a curvature radius at said tip ranges from 0.05 mm to 0.3 mm.

4. The interconnection apparatus of claim 1, wherein said leaf spring is made of a metallic material having a melting point of at least 300° C.

5. The interconnection apparatus of claim 1, wherein a plate thickness of said leaf spring ranges from 0.03 mm to 0.1 mm.

6. The interconnection apparatus of claim 1, wherein said auxiliary spring mechanism comprises a quadrangular plate which is located in a middle of one of the two plate portions and bent inward of said leaf spring to have spring properties.

* * * * *